United States Patent
Su et al.

(10) Patent No.: US 7,627,030 B2
(45) Date of Patent: Dec. 1, 2009

(54) RADIO RECEIVER WITH SELECTIVELY DISABLED EQUALIZER

(75) Inventors: Jie Su, Austin, TX (US); Yong Wang, Suzhou New District (CN)

(73) Assignee: Freescale Semiconductors, Inc., Austin, TX (US)

( * ) Notice: Subject to any disclaimer, the term of this patent is extended or adjusted under 35 U.S.C. 154(b) by 669 days.

(21) Appl. No.: 11/198,602

(22) Filed: Aug. 5, 2005

(65) Prior Publication Data

US 2007/0030932 A1 Feb. 8, 2007

(51) Int. Cl.
H03H 7/30 (2006.01)

(52) U.S. Cl. .................. 375/232; 375/229; 375/316; 375/219; 455/73

(58) Field of Classification Search .......... 375/232, 375/229, 316, 219; 455/73
See application file for complete search history.

(56) References Cited

U.S. PATENT DOCUMENTS

| | | | |
|---|---|---|---|
| 5,291,519 A * | 3/1994 | Tsurumaru ............... 375/230 |
| 5,363,411 A * | 11/1994 | Furuya et al. ............ 375/316 |
| 5,375,143 A * | 12/1994 | Kazecki et al. .......... 375/233 |
| 6,658,245 B2 | 12/2003 | Li et al. | |
| 6,972,617 B2 * | 12/2005 | Hsieh et al. ............. 329/315 |
| 2003/0099310 A1 * | 5/2003 | Zvonar .................... 375/340 |
| 2003/0157914 A1 * | 8/2003 | Li et al. .................. 455/296 |
| 2006/0280268 A1 * | 12/2006 | Sobchak et al. .......... 375/349 |

* cited by examiner

Primary Examiner—Chieh M Fan
Assistant Examiner—Zewdu Kassa
(74) Attorney, Agent, or Firm—Charles W. Bethards

(57) ABSTRACT

A controllable equalizer is arranged to be automatically and selectively disabled and is configured to operate in a frequency modulated (FM) radio receiver. The controllable equalizer includes an equalizer (115) that is configured to perform an equalization algorithm, e.g., CMA, that relies on a predetermined distribution for a received signal, where the received signal is available from the FM radio receiver and a spurious signal detector (123) that is configured to determine whether a spurious signal is present in the received signal and to disable the equalizer when the spurious signal is present. A method (300) of automatically and selectively disabling an equalizer operating in a frequency modulated (FM) radio receiver includes performing an equalization algorithm (307) on an FM received signal, the equalization algorithm relying on a predetermined distribution of the FM received signal, determining whether a spurious signal is present (309) in the FM received signal; and disabling the equalizer (317) when the spurious signal is present in the FM received signal.

15 Claims, 4 Drawing Sheets

RADIO RECEIVER WITH SELECTIVELY DISABLED EQUALIZER

FIELD OF THE INVENTION

This invention relates in general to receivers and more specifically to techniques and apparatus in a receiver with an equalizer for selectively disabling the equalizer.

BACKGROUND OF THE INVENTION

Radio receivers are known. Equalizers for correcting or mitigating the effects, for example, of the channel or adjacent channel signals are also known. For example, frequency modulated (FM) receivers for use in entertainment products (automobile or home FM receivers) are known to use equalizers to effectively reduce the level of multi-path noise or adjacent channel interference and thus improve weak signal quality. Unfortunately the use of some equalizers in some instances can have unintended results. Often these unintended results arise when an equalizer is operating in accordance with presumptions about the signal to be equalized and for one reason or another, the presumptions are not an accurate reflection of present circumstances.

For example in an FM radio receiver an equalizer may be arranged to operate assuming the desired signal has a constant envelop, i.e. the equalization algorithm will seek to generate a constant envelop signal. In some cases this can lead to severe distortion or elimination of the actual desired signal. For instance, if a spurious signal is present in the desired signal as the result of a receiver performance problem or other situation, the equalizer may effectively track the spurious signal.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
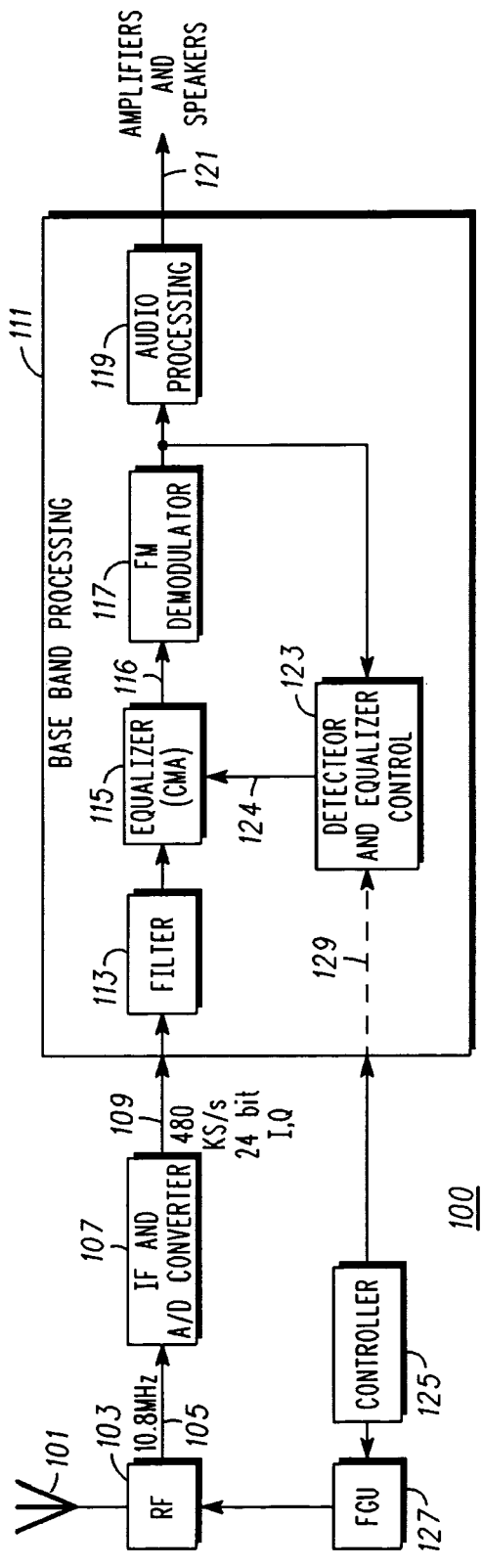
FIG. 1 depicts in a simplified and representative form, a high level block diagram of a receiver using an equalizer in accordance with one or more embodiments.

In overview, the present disclosure concerns receivers and associated equalizers, and more specifically techniques and apparatus for selectively and automatically disabling the equalizer under certain circumstances, thereby avoiding any detrimental impact that the equalizer may have in those situations. More particularly various inventive concepts and principles embodied in methods and apparatus, e.g., receivers, equalizers, integrated circuits and firmware, and the like for detecting a spurious signal and responsive thereto automatically disabling the equalizer as long as the spurious signal is present, will be discussed and disclosed.

The apparatus in various embodiments of particular interest may be or include receivers or the like for receiving and otherwise processing Frequency Modulated (FM) signals, such as FM broadcast signals or similar signals. These receivers may be employed in various transportation vehicles, such as automobiles, trucks, or similar vehicles as well as other forms of equipment such as construction or agricultural equipment and the like. These receivers may be found in various forms of entertainment equipment, including portable and home based receivers and the like. Such receivers or the equalizer portion thereof may be subject to spurious signals and the like where the spurious signals are within the normal signal bandwidth. Systems, equipment and devices constructed and operating to receive multiplexed signals, e.g., FM broadcast signals, may advantageously utilize one or more of the methods and apparatus described below when practiced in accordance with the inventive concepts and principles as taught herein.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including possibly application specific ICs or ICs with integrated processing controlled by embedded software or firmware. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Referring to FIG. 1, a simplified and representative high level diagram of a receiver using an equalizer 100, where the equalizer is selectively and automatically disabled when appropriate in accordance with one or more embodiments will be briefly discussed and described. In FIG. 1, an antenna 101 or the like is coupled to a radio frequency (RF) function 103. The RF function is known and operates to amplify, broadband filter, and, using a mixer and local oscillator (FGU 127), down convert RF signals available from the antenna, e.g. FM signals in a frequency band around 100 MHz in one or more embodiments, to an Intermediate Frequency (IF) signal at output 105. In various embodiments a desired signal corresponding to the channel (one of many) the receiver is tuned to is centered at the IF frequency, e.g., 10.8 MHz. Unfortunately, the RF function may produce spurious signals that are present in the IF signal when the RF function is tuned to certain channels and not present when the RF function is tuned to other channels.

The IF signal is coupled to an IF and analog to digital converter (A/D) function 107. The IF and A/D function are also known. The IF portion operates to attenuate all signals other than the desired signal centered at the IF frequency, e.g., 10.8 MHz, amplify the desired signal, and down convert the desired signal from the IF frequency to a base band (near zero) frequency. The A/D converts the base band signal from an analog format to a digital format and this digital signal is provided at the output 109 of the IF function. In various exemplary embodiments this digital signal may be a multiplexed signal (i.e., FM stereo broadcast signal) and comprises 24 bit complex samples at a rate of 480 thousand samples per second (KS/s).

This digital signal at output 109 is coupled to a baseband processing unit 111. Much or all of the baseband processing unit can be implemented in an integrated circuit form comprising hardware or hardware together with some form of a known processor (digital signal processor, reduced instruction set processor, or the like) executing firmware and performing numerical processing on the samples of the signal at output 109. The base band processing unit 111 includes, inter coupled as depicted, a known filter 113 having a variable bandwidth, an equalizer 115 configured for executing an equalization algorithm, such as a constant modulus algorithm (CMA), a known FM demodulator 117 for demodulating the multiplex signal to provide a demodulated signal as well as an audio processing block 119 for various audio processing operations. The output signal(s) from the audio processing block 119 is passed at outputs 121 to a digital to analog converter, then to audio amplifiers and from there to speakers or the like (not specifically shown).

Various embodiments of the filter 113 and an equalizer (similar to one or more embodiments of equalizer 115) executing one or more versions of a CMA are described and discussed in US Patent Application Publication No. 2003/0157914 which is hereby incorporated herein in its entirety. The FM demodulator 117 is generally known and operates to convert an FM modulated input signal to the corresponding modulation signal, i.e., demodulates an FM received signal to provide a demodulated signal for audio processing. In essence the FM demodulator converts an instantaneous frequency to a signal and thus changes in frequency to a changing signal. The audio processing block 119 is a known function that need not be further described.

Equalizers that operate given an assumption about the desired signal distribution, such as an equalizer using a CMA algorithm can yield undesired results when the desired signal distribution does not look like the assumed or given distribution. For example the CMA attempts to restore a constant envelope (constant modulus) to any input signal on the presumption that an FM signal (as is normally the case) should have a constant envelop or amplitude. Under normal circumstances where the desired signal is the controlling signal and some interference, e.g. multi-path noise or signal from an adjacent channel has been combined with the desired signal one of the effects will be a varying envelope. Once the CMA has processed this signal some of the envelop variation will be removed and in effect the interfering and weaker signal will be suppressed. This is even more pronounced when the frequency components of the interfering signal are spaced away from the desired signal (i.e., adjacent channel signals). However, when the signal being processed according to the CMA is comprised of a desired signal and, e.g., a spurious single tone interference that is an in band (within the bandwidth of the desired signal) constant module signal, problems arise whenever the spurious signal is larger than the desired signal. Essentially the CMA or corresponding CMA filter ends up adapting to the spurious signal and suppressing the desired signal in an attempt to establish a constant modulus and in these instances the equalizer actually exacerbates any problem that may have been caused by the spurious signal.

The base band processing unit 111 also includes a detector or spurious signal detector and equalizer control function 123. The detector/control function 123 in one or more embodiments is coupled to the FM demodulator and receives a multiplex signal, i.e., demodulated signal, at 480 KS/s where the samples are 24 bits. The detector is configured to determine whether a spurious signal is present in the received signal or multiplexed signal at the input to the FM demodulator and if so to disable the equalizer via the signal at 124. The detector in one or more embodiments determines an offset or offset level, e.g., direct current (DC) offset or DC level, associated with the demodulated signal at an output of the demodulator 117. The offset has been experimentally shown to be correlated or associated with a spurious signal in the received signal as processed by the equalizer. A more detailed discussion of the detector and control function is provided below with reference to FIG. 2.

Further shown in FIG. 1 is a controller 125 and a frequency generation unit (FGU) 127. The controller 125 is coupled to the FGU 127 as well as the base band processing unit 111, specifically the detector 123 at 129. The controller 125 is used to control the FGU such that the FGU generates an appropriate local oscillator signal where the local oscillator signal is coupled to the RF function 103. The frequency of the local oscillator signal is used to drive a mixer or down converter in the RF unit such that a desired channel or station is converted to the IF frequency. Thus the local oscillator signal, as selected or determined by the controller, is used to tune the RF function and hence radio receiver to a given station or to new stations or channels. Numerous other functions (e.g., user interface, radio data systems, various control related interfaces and functions) are not specifically depicted but will be understood by one of ordinary skill to be present in a typical embodiment of the receiver of FIG. 1.

In summary and in operation, the radio receiver 100 includes an equalizer 115 that is configured to be selectively and automatically disabled via the control signal at 124. The radio receiver includes the RF function/section 103 that is coupled to the IF function/section 107 and these are configured to provide a received signal at 109. The radio frequency section 103 and thus receiver is tunable, via the FGU 127 to any one of a plurality of stations. The equalizer 115 is coupled, e.g., via the filter 113, to the IF section, and is configured to perform an algorithm on the received signal where the algorithm in various embodiments relies on a predetermined distribution for a received signal, e.g., an algorithm that corresponds in various embodiments to a constant modulus algorithm (CMA). Further included is the demodulator 117 that is coupled to the equalizer and configured to demodulate a frequency modulated (FM) received signal to provide a demodulated signal for audio processing, via processing block 119, and a detector or offset detector that is configured to determine an offset associated with the demodulated signal at an output of the demodulator and to selectively disable the equalizer in accordance with the offset. The detector is effectively a spurious signal detector in various embodiments.

Thus FIG. 1 in part depicts a controllable equalizer that is arranged to be automatically and selectively disabled and is configured to operate in a frequency modulated (FM) radio receiver. The controllable equalizer includes the equalizer 115 which can be configured to perform an equalization algorithm, e.g., CMA, that relies on a predetermined distribution for a received signal that is available from the FM radio receiver and a spurious signal detector (detector 123) configured to determine whether a spurious signal is present in the received signal and to disable the equalizer when the spurious signal is present.

The offset detector as will be further discussed below in one or more embodiments further comprises a direct current (DC) level or DC offset level detector configured to provide a DC level of the demodulated signal that advantageously corresponds to the spurious signal. This offset detector includes a comparator configured to compare the DC level to a threshold and provide a control signal to disable the equalizer when the threshold is satisfied, i.e., when the threshold is exceeded. The DC level detector in various embodiments comprises one or more low pass filters serially coupled to one or more down samplers with an output coupled to a DC low pass filter (low frequency cutoff) to provide the DC level. When the equalizer is disabled it can be bypassed or simply set to have a uniform response with respect to frequency. Thus the demodulator demodulates the received signal after equalization when the equalizer is enabled and demodulates the received signal (no equalization) when the equalizer is disabled. Generally in various embodiments as will be further discussed, the offset detector is configured to detect the presence of a spurious signal within the bandwidth of the IF section when the equalizer is enabled. The equalizer, once disabled by the offset detector, remains disabled until the RF section is tuned to a new station. Thus when a new station is tuned to, via the RF section, controller, and FGU, the equalizer is initially enabled but will be disabled if a spurious signal is detected (excess DC offset is detected) and will remain disabled until the receiver is tuned to another new station.

Figure 2:
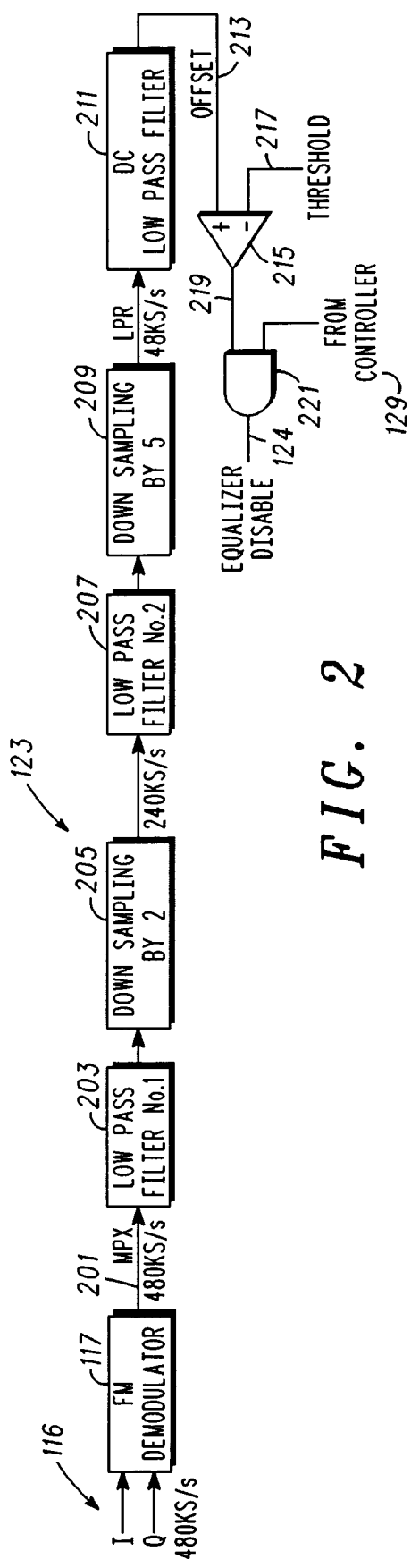
FIG. 2 shows a representative block diagram of a detector that may be used to selectively and automatically disable the equalizer included in the receiver of FIG. 1 in accordance with one or more embodiments.

Referring to FIG. 2, a representative block diagram of a detector 123 that may be used to selectively and automatically disable the equalizer included in the receiver of FIG. 1 in accordance with one or more embodiments will be briefly discussed and described. The detector 123 of FIG. 2 may be viewed as one embodiment of a spurious signal detector or an offset detector. FIG. 2 shows the signal at 116 (i.e., a complex signal at 480 KS/s in various embodiments) coupled to the FM demodulator 117. The output of the FM demodulator at 201 is a base band MPX signal at a sample rate of 480 KS/s. This is supplied to a low pass filter 203 having a cutoff frequency around 120 KHz. This filter may be implemented as a Finite Impulse Response (FIR) filter or in another known filter architecture. The signal at the output of the low pass filter 203 is coupled to a down sampler 205 that essentially discards every other sample and thus provides a 240 KS/s signal. The signal from down sampler 205 is coupled to another low pass filter 207 that may be implemented as a FIR filter or the like and has a cutoff frequency around 24 KHz. The output signal from low pass filter 207 is coupled to another down sampler 209 that basically discards 4 out of 5 samples and thus provides a signal at a 48 KS/s rate. This signal is applied to a DC-low pass filter 211 that has a cutoff frequency around 10 Hz and may be implemented as an Infinite Impulse Response (IIR) filter or a FIR filter or the like.

The output at 213 from the DC-low pass filter 211 is essentially a DC level representing the DC offset of the demodulated signal, which can correspond to the presence of a spurious signal included with the input signal to the FM demodulator at 116, at least when the equalizer is operating. Thus the detector 123 comprises one or more low pass filters serially coupled to one or more down samplers with an output coupled to a DC low pass filter to provide the DC level or DC offset level. The detector further comprises a comparator 215 that is coupled to the DC level at 213 from the filter 211 and a threshold at 217. The threshold can be experimentally determined and will vary with the conversion sensitivity of the FM demodulator, any detector gains, possibly equalizer algorithm, and other known variables. In one experimental embodiment the offset level observed without any spurious signal was less than 20 millivolts (mv), while offset levels exceeding 150 mv were observed for spurious signals within 100 KHz of the desired signal. The comparator is configured to compare the offset or DC level to the threshold and to provide a control signal at 219 that may be used to disable the equalizer when the threshold is satisfied. The control signal at 219 is coupled to an AND gate 221 that also has an input from the controller at 129.

In practice when the receiver or RF section is tuned to a new station, e.g., as a result of a user request, a period of time is allowed to pass, where the period of time is sufficient to allow the RF section to be retuned and along with other functions (filter 113, equalizer 115, detector filters, etc) to stabilize. After this period of time (50-100 ms in one embodiment) lapses, the input from the controller will go high and thus the control signal at 219 will be gated to the equalizer. If the threshold has been satisfied (e.g., exceeded with the polarities as shown) a high signal at the output 124 of the AND gate will be provided to and will disable the equalizer. Note that a latch or latching function (not shown) may be needed to maintain the control signal at the high level and thus keep the equalizer disabled until another new channel is tuned to. Note that the functions shown in FIG. 2 may be implemented in hardware or firmware executing on some form of a processor or some combination of each.

Figure 3:
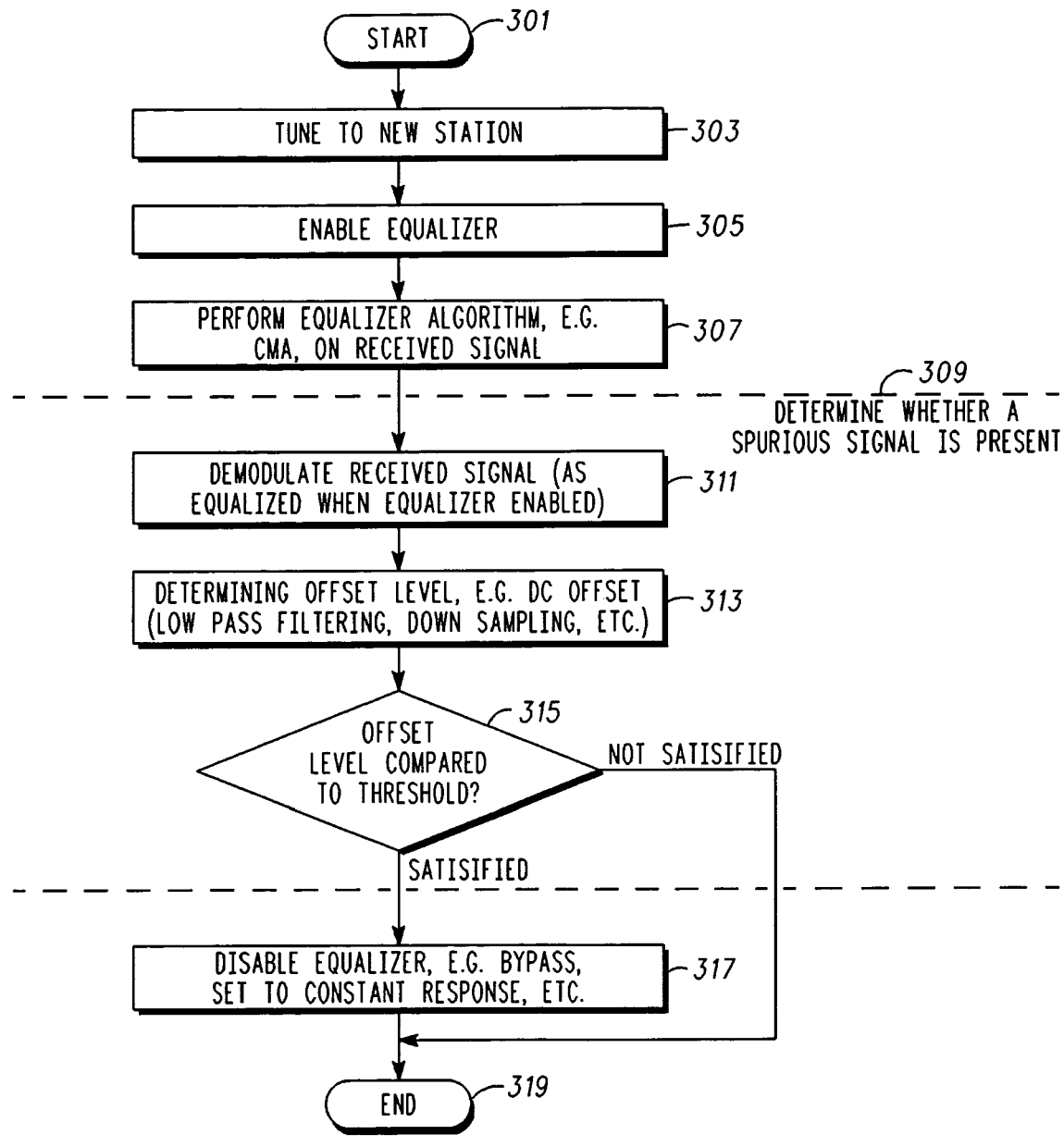
FIG. 3 shows a flow chart illustrating representative embodiments of methods of selectively and automatically disabling an equalizer in accordance with one or more embodiments.

Referring to FIG. 3, a flow chart illustrating representative embodiments of methods of selectively and automatically disabling an equalizer in accordance with one or more embodiments will be discussed and described. It will be appreciated that the method(s) of FIG. 3 use many of the inventive concepts and principles discussed in detail above and thus this description will be somewhat in the nature of a summary with various details generally available in the earlier descriptions. This method can be implemented in one or more of the structures or apparatus described earlier or other similarly configured and arranged structures. FIG. 3 shows an embodiment of a method 300 of selectively and automatically disabling an equalizer operating in a frequency modulated (FM) radio receiver, where the method as an overview includes performing an equalization algorithm on an FM received signal, determining whether a spurious signal is present in the FM received signal and if so disabling the equalizer (see 307, 309, 317).

In more detail the method 300 begins at 301 and then tuning an FM receiver to a new station 303 and enabling the equalizer 305. The method 300 then includes performing an equalization algorithm on an FM received signal, the equalization algorithm relying on a predetermined distribution of the FM received signal, where the FM received signal is available from the FM radio receiver. The performing an equalization algorithm can comprise performing an algorithm corresponding to a constant modulus algorithm (CMA) on the received signal available from the FM radio receiver. Then the process includes determining whether a spurious signal is present 309, e.g., in the FM received signal.

The process 309 can further include demodulating the received signal (as equalized when the equalizer is enabled) 311 to provide a demodulated signal. The determining whether a spurious signal is present 309 further comprises determining an offset level, e.g., direct current (DC) offset level associated with the demodulated signal available from the FM radio receiver 313. The determining an offset level can include filtering and down sampling the demodulated signal to provide a resultant signal and then DC low pass filtering the resultant signal to provide the DC offset level.

The determining whether a spurious signal is present 309 also includes comparing the DC offset level to a threshold 315. If the spurious signal is present, e.g., the threshold is satisfied 315, the equalizer is disabled 317. Disabling the equalizer can be accomplished by bypassing the function or setting all frequency dependent responses to a constant, etc. The process ends at 319 or when the threshold is not satisfied at 315 but may be repeated as needed. For example, the method 300 would be repeated whenever tuning the FM radio receiver to a new station occurs and this would result in activating the performing the equalization algorithm, i.e., responsive to the tuning the FM radio receiver. Note that, once disabled, the method 300 results in continuing to disable the equalizer until the FM radio receiver is tuned to a new station.

Figure 4:
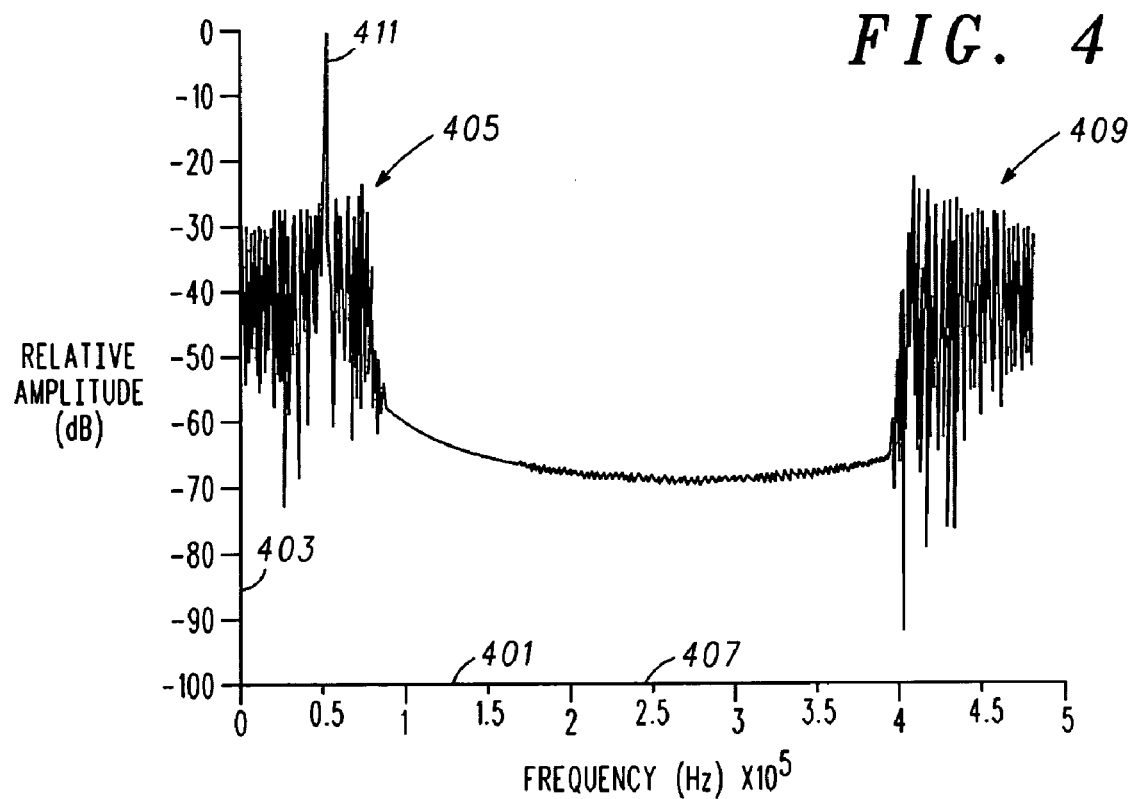
FIG. 4-FIG. 6 depict representative diagrams of various simulation data that has been experimentally derived.
Figure 5:
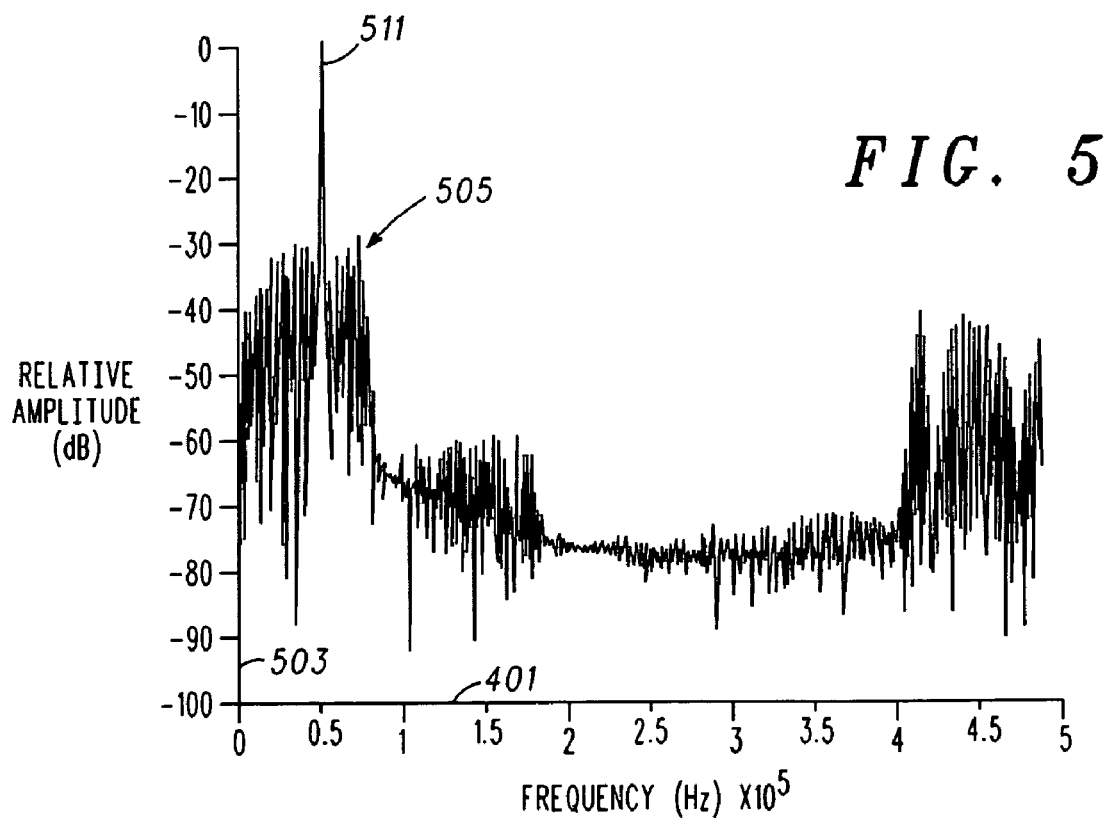
Figure 6:
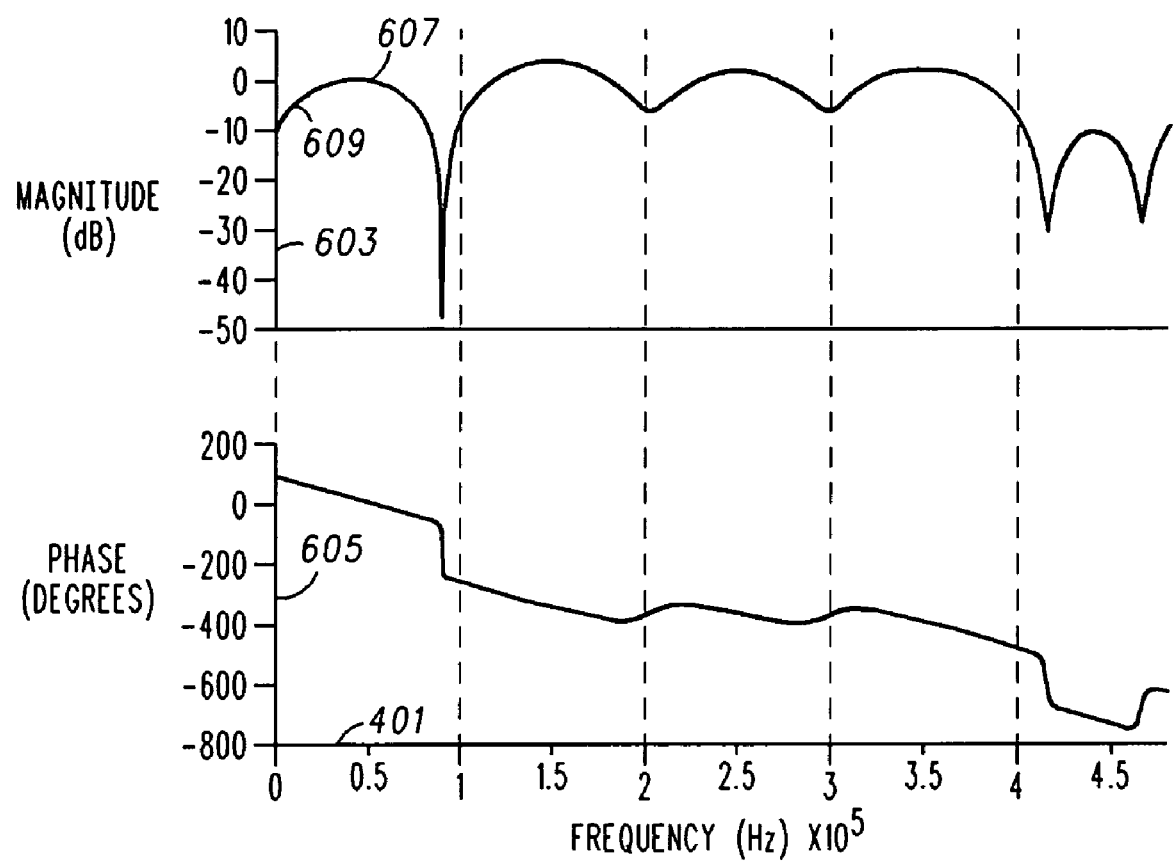

Referring to FIG. 4-FIG. 6 representative diagrams of various simulation data that has been experimentally derived will be discussed and described. The graphs illustrated by these FIGs. were collected in a simulation setup. The simulation setup generated an FM signal at a 50 dB microvolt level using a 1 KHz tone with 75 KHz FM modulation at 50 dB SNR (signal to noise ration) and added to that signal a spurious signal at 58 dB microvolt level where the spurious signal frequency was at 50 KHz. This resultant signal was used as the input signal to 6-tap CMA equalizer running at 480 KS/s.

FIG. 4 illustrates the spectrum of the signal that was input to the equalizer in the simulations. The horizontal axis 401 shows frequency in 100 KHz units and the vertical axis 403 shows relative amplitudes. Note that the spectrum of the desired signal is comprised of portion 405 and portion 409, which should be almost mirrored at half of the sample rate e.g., 240 KHz 407 after a large number of samples or long term average. Note that the spurious signal 411 is 25 to 30 dB larger than the average amplitude of the modulated signal, although they nominally have similar total energy. Note that the amplitude of the modulated signal is more or less flat (within 5 dB or so) over the two frequency ranges of approximately 75 KHz for portions 405, 409.

FIG. 5 shows the spectrum at the output of the equalizer when the signal of FIG. 4 is the input. Here the vertical axis 503 again shows relative amplitude but with a slightly different range. Note the dramatic suppression (5-10 dB) of the modulated signal components 505 relative to the magnitude of the spurious signal 511 as well as significant phase distortion (signal no longer looks as though it is mirrored about 240 KHz).

This is easily understood from FIG. 6, which shows the magnitude and phase responses of the CMA filter as a function of frequency after 2 millions samples. The frequency is shown on the horizontal axis 401 with the relative magnitude read on the first vertical axis 603 and phase on the second vertical axis 605. Note that signals near 50 KHz (the spurious signal frequency) 607 are not attenuated whereas signal components on either side of 50 KHz are attenuated as shown. For example, as much as 10 dB of attenuation is applied to low frequency signal components 609. Note that under the simulated conditions without the spurious signal being present the desired signal component was 0 dB in relative magnitude and CMA filter showed a flat response versus frequency and no phase distortion.

The processes, apparatus, and systems, discussed above, and the inventive principles thereof are intended to and can alleviate various problems that are introduced by equalizers and in band spurious signals and other anomalous issues in, e.g., FM Broadcast systems for automotive or home entertainment systems. Using these principles of determining whether a spurious signal is present by checking offset levels at a demodulator output and if present disabling the equalizer can quickly enhance user satisfaction with relatively minimal costs and the like.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A radio receiver including an equalizer that is configured to be selectively and automatically disabled, the radio receiver comprising:
    a radio frequency (RF) section coupled to an intermediate frequency (IF) section configured to provide a received signal, the radio frequency section tunable to a plurality of stations;
    an equalizer, coupled to the IF section and configured to perform an algorithm corresponding to a constant modulus algorithm (CMA) on the received signal;
    a demodulator coupled to the equalizer and configured to demodulate a frequency modulated (FM) received signal to provide a demodulated signal for audio processing; and an offset detector configured to determine an offset associated with the demodulated signal at an output of the demodulator, the offset being representative of a frequency offset, and to selectively disable the equalizer in accordance with the offset wherein the offset detector further comprises a direct current (DC) level detector configured to provide a DC level corresponding to the demodulated signal; and
    wherein the offset detector further comprises a comparator configured to compare the DC level to a threshold and provide a control signal to disable the equalizer when the threshold is satisfied.

2. The radio receiver of claim 1 wherein the DC level detector further comprises one or more low pass filters serially coupled to one or more down samplers with an output coupled to a DC low pass filter to provide the DC level.

3. The radio receiver of claim 1 wherein the demodulator demodulates the received signal after equalization when the equalizer is enabled and demodulates the received signal when the equalizer is disabled.

4. The radio receiver of claim 1 wherein the offset detector is configured to detect the presence of a spurious signal within the bandwidth of the IF section when the equalizer is enabled.

5. The radio receiver of claim 1 wherein the equalizer, once disabled by the offset detector, remains disabled until the RF section is tuned to a new station.

6. A controllable equalizer that is arranged to be automatically and selectively disabled and is configured to operate in a frequency modulated (FM) radio receiver, the controllable equalizer comprising:
   an equalizer configured to perform an equalization algorithm that relies on a predetermined distribution for a received signal, the received signal available from the FM radio receiver; and
   a spurious signal detector configured to determine whether a spurious signal is present in the received signal and to disable the equalizer when the spurious signal is present wherein the spurious signal detector comprises an offset detector that is configured to determine an offset level associated with a demodulated signal available from the FM radio receiver, and wherein the offset detector is further configured to determine a direct current (DC) offset level of the demodulated signal, the DC offset level corresponding to the spurious signal.

7. The controllable equalizer of claim 6 wherein the equalizer is configured to perform an algorithm corresponding to a constant modulus algorithm (CMA) on the received signal available from the FM radio receiver.

8. The controllable equalizer of claim 6 wherein the offset detector further comprises a comparator configured to compare the offset level to a threshold and to provide a control signal to disable the equalizer when the threshold is satisfied.

9. The controllable equalizer of claim 6 wherein the offset detector further comprises one or more low pass filters serially coupled to one or more down samplers with an output coupled to a DC low pass filter to provide the DC offset level.

10. The controllable equalizer of claim 6 wherein the equalizer, once disabled by the spurious signal detector, remains disabled until the FM radio receiver is tuned to a new signal.

11. A method of automatically and selectively disabling an equalizer operating in a frequency modulated (FM) radio receiver, the method comprising:
   performing an equalization algorithm on an FM received signal, the equalization algorithm relying on a predetermined distribution of the FM received signal, the FM received signal available from the FM radio receiver;
   determining whether a spurious signal is present in the FM received signal; and
   disabling the equalizer when the spurious signal is present in the FM received signal wherein the determining whether a spurious signal is present further comprises determining a direct current (DC) offset level associated with a demodulated signal available from the FM radio receiver,
   wherein the determining whether a spurious signal is present further comprises comparing the DC offset level to a threshold, and
   wherein the disabling the equalizer further comprises disabling the equalizer when the threshold is satisfied by the DC offset level.

12. The method of claim 11 wherein the performing an equalization algorithm further comprises performing an algorithm corresponding to a constant modulus algorithm (CMA) on the received signal available from the FM radio receiver.

13. The method of claim 11 wherein the determining whether a spurious signal is present further comprises filtering and down sampling the demodulated signal to provide a resultant signal and then DC low pass filtering the resultant signal to provide the DC offset level.

14. The method of claim 11 further comprising tuning the FM radio receiver to a new station; and activating the performing the equalization algorithm responsive to the tuning the FM radio receiver.

15. The method of claim 11 further comprising, once disabled, continuing to disable the equalizer until the FM radio receiver is tuned to a new station.

* * * * *